United States Patent [19]

Rolland

[11] Patent Number: 4,948,669

[45] Date of Patent: Aug. 14, 1990

[54] FLAME RETARDANT ETHYLENE POLYMER BLENDS

[75] Inventor: Loic P. Rolland, Divonne les Baine, France

[73] Assignee: E. I. du Pont de Nemours and Company, Wilmington, Del.

[21] Appl. No.: 300,021

[22] Filed: Jan. 25, 1989

Related U.S. Application Data

[63] Continuation-in-part of Ser. No. 153,722, Feb. 8, 1988, abandoned.

[51] Int. Cl.$^5$ .................. B32B 15/00; C08K 3/10; C08K 3/22
[52] U.S. Cl. .......................... 428/379; 524/89; 524/437; 524/504; 524/528
[58] Field of Search ............. 428/379; 524/437, 528, 524/504, 89

[56] References Cited

U.S. PATENT DOCUMENTS

| | | | |
|---|---|---|---|
| 4,430,468 | 2/1984 | Schumacher et al. | 524/437 |
| 4,434,258 | 2/1984 | Schumacher et al. | 524/437 |
| 4,673,620 | 6/1987 | Shulman | 428/500 |
| 4,701,359 | 10/1987 | Akao | 428/500 |

OTHER PUBLICATIONS

"Polypropylene", J. P. McCarthy, 1984-5, Modern Plastics Encyclopedia.
"Polypropylene", D. A. Durand, 1985-1986, Modern Plastics Encyclopedia.

*Primary Examiner*—Herbert J. Lilling

[57] ABSTRACT

Wire insulation and cable jacketing compositions comprise blends of ethylene copolymers and propylene polymers.

5 Claims, No Drawings

FLAME RETARDANT ETHYLENE POLYMER BLENDS

CROSS-REFERENCE TO RELATED APPLICATION

This is a continuation-in-part of application Ser. No. 07/153,722 filed Feb. 8, 1988, now abandoned.

FIELD OF THE INVENTION

Halogen-free flame-retardant materials are desirable to provide both insulation and jacketing in low-voltage cables in areas where it is necessary to avoid the generation of corrosive gas in case of fire. Such areas where halogen-free low-voltage cables are useful include hotels, hospitals, schools and theaters.

Insulating materials should have adequate electrical, physical, and flame retardant properties. These include insulation resistance; tensile strength and elongation; resistance to aging at 100° C.; resistance to knife penetration at 70° C.; impact resistance at −25° C.; cold bend at −15° C.; low water absorption at 70° C.; limited creep at 80 C.; and heat shock resistance at 150° C. Jacketing materials should have high flame retardant properties and good physical properties. It is desirable that one material combine good flame retardant, electrical, and physical properties.

No previously available insulation or jacketing material meets all the requirements, so it is desirable to find such materials.

SUMMARY OF THE INVENTION

A composition having good electrical, physical, and flame retardant properties has been made comprising 29 to 50% by weight linear low density polyethylene containing enough recurring units of an alkene-1 comonomer of 4–12 carbon atoms to provide a density of less than 0.92 but preferably above 0.90 (preferably using octene-1 as the comonomer); 3 to 15 wt. % based on the total composition of polypropylene material selected from the class consisting of:

(1) polypropylene homopolymer,
(2) nonelastomeric copolymer of propylene and ethylene, and
(3) melt-compounded blends or grafts of (1) or (2) with an elastomeric ethylene/propylene copolymer;

45–65 weight % based on composition of alumina trihydrate; 0.5 to 1.5 weight % based on composition of a coupling agent containing a hydrolyzable moiety containing titanium or silicon and also containing an organophilic group; and an antioxidant in an amount sufficient to improve heat aging properties (preferably 0.2 to 1.5 weight % antioxidant).

DETAILS OF INVENTION

The linear low density polyethylene (LLDPE) is preferably modified with octene-1 in amounts of 6–22 weight %, based on LLDPE, preferably 13 to 20 weight %. The LLDPE used in the examples was Dowlex ® 4000E (from Dow Chemical Company), and contained about 17% octene recurring units, and had a melt index of 3.3 and a density of 0.912. The analysis for octene content of LLDPE was performed by infrared spectroscopy after careful calibration for -$CH_3$ absorption using copolymers characterized by NMR. LLDPE provides a higher melting point than other matrix polymers which might be used, including ethylene/vinyl acetate and ethylene/ethyl acrylate. The LLDPE used also has good low temperature properties and very good tensile properties. The maximum amount of octene, and therefore the minimum density, is limited by the feasibility of production. If too little octene is used in the LLDPE, resulting in too high a density, there will be some loss in low temperature properties, compatibility with the filler, flexibility, and impact resistance.

Other comonomers can be used, as mentioned above. The melt index is generally 1–5, preferably 2–4.

The LLDPE is 29–50 % by weight of the total composition. For insulation, it is preferably 38–45%, while for jacketing it is preferably 29–34%.

It is important to use polypropylene in the composition, but the type of polypropylene is not critical. In preliminary tests, it proved possible to use propylene homopolymer; a plastic ethylene/propylene copolymer (reactor-synthesized impact resistant polymer may be used here); or a rubber-modified polypropylene, which gave the best overall results. The chief advantage of rubber-modified polypropylene is that it makes it possible to pass the heat shock test at 150° C. without excessive loss of impact resistance.

The polypropylene component should have a melt flow between 4 and 8, preferably between 5 and 7. Melt flow of the rubber modified polypropylene used in the Examples was 6.

The amount of polypropylene is 3 to 15% by weight of the total composition. For insulation, 4–10% is preferred, while for jacketing, 3–7% is preferred.

The rubber-modified polypropylene used in the Examples was Himont Moplen ® EPX 30U. It is believed to be a plastic ethylene/propylene copolymer modified by the addition of an elastomeric ethylene/propylene copolymer. In this application the term "rubber" or "elastomer" means what is defined as "rubber" by ASTM: "A rubber in its modified state, free of diluents, retracts within 1 min to less than 1.5 times its original length after being stretched at room temperature (18 ° to 29° C.) to twice its length and held for 1 min before release."

It is known that alumina trihydrate filler enhances the flame resistance of many polymers. Considering both the insulation and jacketing requirements, the amount of alumina trihydrate in the composition can be 45–65%. For insulation, the amount of alumina trihydrate is preferably 47–53% by weight of the total composition, while for jacketing the preferred amount is 59–65%. The alumina trihydrate used in the Examples was Martinal ® 104 LE from Martinswerk, Bergheim, W. Germany. Part of the alumina trihydrate can be replaced with $Mg(OH)_2$ or hydrated zinc borate. Inert fillers such as calcium carbonate can also be present.

The coupling agents used in the present invention are known in the art and they contain a hydrolyzable moiety containing titanium or silicon and also an organophilic group. Usually, the hydrolyzable moiety is one or more aliphatic silicate orthoester groups or aliphatic titanate orthoester groups, and can be a chelate group. Representative organophilic groups in the coupling agent include: phosphate esters, pyrophosphate esters, phosphite esters, carboxylic esters, aromatic orthoesters, sulfonyl esters, alkyl or substituted alkyl esters, vinyl esters, epoxy esters, amines, and vinyl groups.

Representative coupling agents, such as described above, have the following chemical structures.

Organotitanate coupling agents have the formula $(RO)_m\text{-}Ti(OXR^2Y)_n$ where (RO) is a monoalkoxy group or two (RO) groups are a chelate group. Usually the alkoxy group contains 1–5 carbon atoms, X is sulfonyl, phosphato, pyrophosphato or phosphito; $R^2$ is an alkylidene group, usually containing 3–20 carbon atoms or an arylene group, usually containing 6–12 carbon atoms; Y is hydrogen, an alkyl group, usually containing 1–6 carbon atoms, a vinyl group, an amino group or a mercapto group; m is 1–3 and n is 1–3.

Silane coupling agents have the formula $YRSiX_3$ or $(YR)_2SiX_2$ where Y is a functional organic group, especially a vinyl, amino, acryloxy or epoxy group; R is an alkylidene group, usually containing 2–4 carbon atoms, and X is a hydrolyzable group, especially alkoxy, usually containing 1–2 carbon atoms.

The amount of coupling agent in the composition is an amount that improves the tensile properties. Preferably this amount can be 0.5 to 1.5%, most preferably 0.8 to 1.2%.

It is believed that the inorganic portion of the coupling agent reacts with the hydroxy groups on the surface of the alumina trihydrate and the organic portion of the coupling agents readily blends or reacts with the polymer. The coupling agent leads to an increase in the tensile strength of the composition without detrimentally affecting other properties.

The coupling agent used in the Examples was Ucarsil ® FR 501 from Union Carbide Corporation, which is believed to have a silicon-containing hydrolyzable moiety and a silyl or vinyl-containing organophilic moiety. It can be used in conjunction with a catalyst to enhance its reactivity, but in the composition of this invention the use of the catalyst reduced the tensile elongation of the product (both before and after heat aging) to an undesirable degree.

The choice of an antioxidant or antioxidants is not critical, since numerous antioxidants are known to help the heat aging performance of polyolefins. Among these are amines, phenols, phosphites, and thioesters. The antioxidant used in the Examples is 2,2,4-trimethyl-1,1,2-dihydroquinoline (Flectol ® H from Monsanto Chemical Company). The antioxidant is used in an amount effective to improve the tensile properties after heat aging. This is a small quantity, typically 0.1–1.5 weight %, preferably 0.6–1.0%.

The ingredients are melt blended together. The blending apparatus and conditions are not critical, provided that the shear rate is high enough to provide good dispersion of the filler in the polyolefins and the melt temperature is high enough so that the tensile properties meet the goals.

Where insulation properties are particularly desirable, a preferred composition will be defined as comprising 38–45% by weight linear low density polyethylene containing 10 to 15 weight % recurring units of octene-1 comonomer; 4–10% of rubber-modified polypropylene; 47–53% of alumina trihydrate; 0.8–1.2% coupling agent containing a hydrolyzable moiety containing titanium or silicon and also containing an organophilic group; and an antioxidant in an amount that improves heat aging.

Where jacketing properties are particularly desirable a preferred composition will be defined as comprising 29 to 34% by weight linear low density polyethylene containing 10 to 15 weight % recurring units of octene-1 comonomer; 3–7% of rubber-modified polypropylene; 59 to 65% of alumina trihydrate; 0.8–1.2% coupling agent containing a hydrolyzable moiety containing titanium or silicon and also containing an organophilic group; and an antioxidant in an amount that improves heat aging.

TEST METHODS

In the attached tables, the abbreviations have the following meanings and the test methods are as described:

Tensile strength (TS) and elongation (E) are measured by IEC (International Electrotechnical Commission) Publication 540-5.1.

Aging is done according to IEC 540-6.1.4.

Knife deformation is measured by IEC 540-8 after 4 hours at 70° C.

Heat shock is measured after 1 hour at 150° C. by IEC 540-10.1 at 150° .C. for 1 hour.

Cold bend is measured by IEC 540-9.1.

Low temperature impact resistance is measured by IEC 540-9.5 at −25° C., as modified by IEC 811-1-4-8.5.

Shrinkage at 80° C. is measured by IEC 540-20.

Water absorption is measured by IEC 540-19.2.

Limiting oxygen index is measured by ASTM-D-2863.

Melt index is measured by ASTM-D 1238-E.

Melt flow rate is measured by ASTM-D 1238-L.

Electrical resistance is measured by immersing 5 m of coated wire in water at 70° C. for 10 days, then applying 500 V between the conductor and the water. The resistance should be at least 2 megohmkm.

EXAMPLES

Example 1.

The ingredients shown in Table I were mixed in a Buss Ko-Kneader, (MDK46-110), made by Buss A. G., Basel, Switzerland. This is a high-shear device using a rotating shaft with projections on the shaft and projections on the barrel, leading to high shear as the shaft reciprocates inside the barrel. A dry blend of the polyolefins was prepared. Separately, a dry blend of alumina trihydrate, antioxidant, and coupling agent was made with a high speed rotating blade mixer. Half of the latter was dry blended with all the polyolefins blend and fed to the upstream hopper of the Ko-Kneader. The other half of the additives blend was fed to the hopper halfway down the Ko-Kneader barrel. The Ko-Kneader rotating member was 46 mm in diameter, the length/diameter ratio was 11, and the rotating member turned at 240 rpm. The maximum melt temperature was 212° C. The product was granulated and later fed to a Reifenhauser 50 mm single-screw extruder with compression ratio 1.25 and length/diameter ratio 25:1, equipped with a wire-coating crosshead for pressure coating a 1 mm coating onto AWG12 (2.27 mm) copper wire. Melt temperature was 189° C. After a 1.5 m air gap, the wire, moving at 16 m/minute (in other experiments, wire rate was increased by more than an order of magnitude), was quenched with cold water. Its outer diameter was 4.26–4.33 mm. Spark testing at 5.0 kV showed no faults. Wire test data are in Table I, and they met all the desired specifications for insulation. Further testing of the resistance between the wire and a 70° C. water bath showed that the product had a resistance of 6.5 megohmkm, well above the goal.

Example 2.

The ingredients shown in Table I were mixed in the same manner as in Example 1. The granulated product was fed to the same extruder and used to coat the same size wire at a polymer temperature of 193° C. at 17 m/minute. Spark testing at 5.0 kV showed no faults. While the product met specifications, the use of 10% rubber-modified polypropylene resulted in poorer elongation after heat aging.

Example 3.

The ingredients shown in Table I were mixed in the same manner as in Example 1. The granulated product was fed to the same extruder and used to coat the same size wire at a polymer temperature of 200° C. at the same conditions, except the wire speed was 15 m/minute. Again the spark testing at 5.0 kV showed no faults. Outer diameter was 4.27-4.30 mm. Product measurements are in Table I, and all goals for jacketing were met.

Examples 4–9 and Comparative Examples 1–4.

These examples were made by mixing the polymers on a roll mill at a temperature between 150° C. and 180° C., then adding the other components. The mixture, while still hot, was moved to a compression press and placed between films of ethylene/tetrafluoroethylene copolymer in a chase 3 mm thick. The press was at the same temperature as the roll mill, and each sample was pressed for 3 minutes, then cooled while under pressure. The 3 mm plaques made this way were tested for ultimate tensile strength and elongation and for heat shock, as preliminary screening tests. The results are shown in Table II. It is seen that the compositions of Examples 4–9 meet several critical property goals, but when alumina trihydrate was not present, the flame resistance was low.

Example 10.

This example shows that butene-modified LLDPE can be used in the present invention. Example 1 was repeated except that the high octene LLDPE was replaced by high butene LLDPE with a density of 0.910, produced by CDF in France under the trade name Norsoflex ® LW 2220. The melt temperature during wire coating was 201° C. and the line speed was 16 m/min. The test data on the insulated wire met goals in every test that was run:

| | |
|---|---|
| tensile strength | 14.1 MPa |
| tensile elongation | 222% |
| heat shock | pass |
| tensile strength after aging 7 days at 100° C. | 14.2 |
| % change on aging | +0.7% |
| tensile elongation after aging 7 days at 100° C. | 180% |
| % change on aging | −18.9% |

TABLE I

| COMPARISON OF EXTRUDED FORMULATIONS WITH GOALS | | | | | |
|---|---|---|---|---|---|
| Run Number | Goal Insulation | 1 | 2 | Goal Jacketing | 3 |
| % High Octene LLDPD | | 37 | 32 | | 30 |
| % Rubber Mod PP | | 5 | 10 | | 6 |
| % Alumina Trihydrate | | 56.2 | 56.2 | | 62.2 |
| % Organosilicon agent | | 1 | 1 | | 1 |
| % Antioxidant | | 0.8 | 0.8 | | 0.8 |
| % Calcium Carbonate | | 0 | 0 | | 0 |
| Melt Temperature deg C | | 189 | 193 | | 200 |
| Line speed M/min | | 16 | 17 | | 15 |
| Tensile Strength MPa | >6 | 15.9 | 15.5 | >8 | 16.5 |
| Tensile Elongation % | >125 | 290 | 302 | >125 | 137 |
| Knife deformation % | <50 | 1.69 | 3.53 | <50 | 0.71 |
| Heat Shock 1H 150 deg C | pass | pass | pass | pass | pass |
| Aged TS 100 deg C 7 days | >5 | 15.25 | 13.8 | >7 | 16.3 |
| % change on aging | <±30 | −4 | −11 | <±30 | −1.2 |
| Aged % E 100 deg C 7 days | >100 | 287 | 234 | >100 | 102 |
| % change on aging | <±30 | −1 | −22.5 | <±30 | −25 |
| Cold bend −15 deg C | pass | pass | pass | pass | pass |
| Low temp impact −25 deg C | pass | pass | pass | pass | pass |
| % Shrink 80 deg C | <4% | 0.22 | 0.32 | <4% | 0.09 |
| Water absorption mg/cm sq | <4 | 1.7 | 1.6 | <10 | 3.1 |
| Limiting Oxygen Index % | >25 | 27 | * | >30 | 32 |
| Specific gravity g/cc | | 1.394 | | | 1.58 |

*Failed because of inadequate mixing.

TABLE II

| SCREENING TESTS USING MOLDED PLAQUES | | | | | | | | | | |
|---|---|---|---|---|---|---|---|---|---|---|
| | Octene LLDPE | PP Homo | PP Co-poly | Rubber Mod PP | Alum Tri-Hydrate | Organo Silicone | Anti Oxidant | CaCO3 | UTS MPa | % ULT Elong. | Heat Shock |
| Exam. | | | | | | | | | | | |
| 4 | 44 | | | 5 | | 1 | 0.8 | 49.2 | 9.66 | 618 | pass |
| 5 | 39 | | | 10 | | 1 | 0.8 | 49.2 | 9.62 | 537 | pass |
| 6 | 40 | | 10 | | | | 0.8 | 49.2 | 8.31 | 196 | pass |
| 7 | 40 | 10 | | | | | 0.8 | 49.2 | 10.64 | 155 | pass |
| 8 | 32 | | | 8 | 58.2 | 1 | 0.8 | | 12.4 | 190 | |
| 9 | 32 | | | 8 | | 1 | 0.8 | 58.2 | 9.3 | 250 | |
| Comp. Exam. | | | | | | | | | | | |

TABLE II-continued

| | SCREENING TESTS USING MOLDED PLAQUES | | | | | | | | | | |
|---|---|---|---|---|---|---|---|---|---|---|---|
| | Octene LLDPE | PP Homo | PP Co-poly | Rubber Mod PP | Alum Tri-Hydrate | Organo Sili-cone | Anti Oxi-dant | CaCO3 | UTS MPa | % ULT Elong. | Heat Shock |
| 1 | 45 | 5 | | | | | 0.8 | 49.2 | 9.74 | 643 | sligthly molten |
| 2 | 49 | | | | | 1 | 0.8 | 49.2 | 8.87 | 613 | slightly molten |
| 3 | 30 | 20 | | | | | 0.8 | 49.2 | 10.86 | 0 | pass |
| 4 | 30 | | | 20 | | | 0.8 | 49.2 | 7.71 | 20 | |

UTS = ultimate tensile strength

I claim:

1. A composition consisting essentially of 29 to 50 % by weight of composition of a linear low density polyethylene containing recurring units of an alkene-1 comonomer of 4–12 carbon atoms sufficient to provide a density less than 0.92; 3 to 15% of polypropylene material selected from the class consisting of
   (a) polypropylene homopolymer,
   (b) nonelastomeric copolymer of propylene and ethylene, and
   (c) melt-compounded blends or grafts of (a) or (b) with an elastomeric ethylene/propylene copolymer; 45–65% of alumina trihydrate; 0.5 to 1.5% of a coupling agent containing a hydrolyzable moiety containing titanium or silicon and also containing an organophilic group; and an antioxidant in an amount that improves heat aging.

2. An insulating composition consisting essentially of 38–45% by weight linear low density polyethylene of density 0.90–0.92 containing 13 to 20 weight % recurring units of octene-1 comonomer; 4–10% of rubber-modified polypropylene; 47–53% of alumina trihydrate; 0.8–1.2% coupling agent containing a hydrolyzable moiety containing titanium or silicon and also containing an organophilic group; and an antioxidant in an amount that improves heat aging.

3. A jacketing composition consisting essentially of 29 to 34% by weight linear low density polyethylene of density 0.90–0.92 containing 13 to 20 weight % recurring units of octene-1 comonomer; 3–7% of rubber-modified polypropylene; 59 to 65% of alumina trihydrate; 0.8–1.2% coupling agent containing a hydrolyzable moiety containing titanium or silicon and also containing an organophilic group; and an antioxidant in an amount that improves heat aging.

4. A halogen-free insulated primary wire of the composition of claim 1 or 2 which passes a heat shock test at 150° C. for 1 hour, passes a cold bend test at −b 15°, passes a low temperature impact test at −b 25° C., has less than 4% shrinkage at 80° C., has a knife deformation of less than 50%, has a limiting oxygen index of greater than 25; and which after removal of the conductor has a tensile strength of greater than 6 MPa, a tensile elongation of greater than 125%, a water absorption of less than 4 mg/cm$_2$; and after removal of the conductor and aging at 100° C. for 7 days has a tensile strength of greater than 5 MPa, changed less than 30% from the unaged strength and has a tensile elongation of greater than 100%, changed less than 30% from the unaged tensile elongation; using the test methods specified herein.

5. A jacketed bundle of insulated wires in which the jacket is made of the composition of claim 1 or 3, which bundle passes a heat shock test at 150° C. for one hour, passes a cold bend test at −15° C., passes a low temperature impact test at −25 C., has less than 4% shrinkage at 80° C., has a knife deformation of less than 50%, has a limiting oxygen index of greater than 30; and the halogen-free jacket of which after removal from the bundle of wires has a tensile strength of greater than 8 MPa, a tensile elongation of greater than 125%, a water absorption of less than 10 mg/cm$_2$; and after aging at 100° C. for 7 days has a tensile strength of greater than 7 MPa, changed less than 30% from the unaged strength and has a tensile elongation of greater than 100%, changed less than 30% from the unaged tensile elongation, using the test methods specified herein.

* * * * *